Patented May 29, 1934

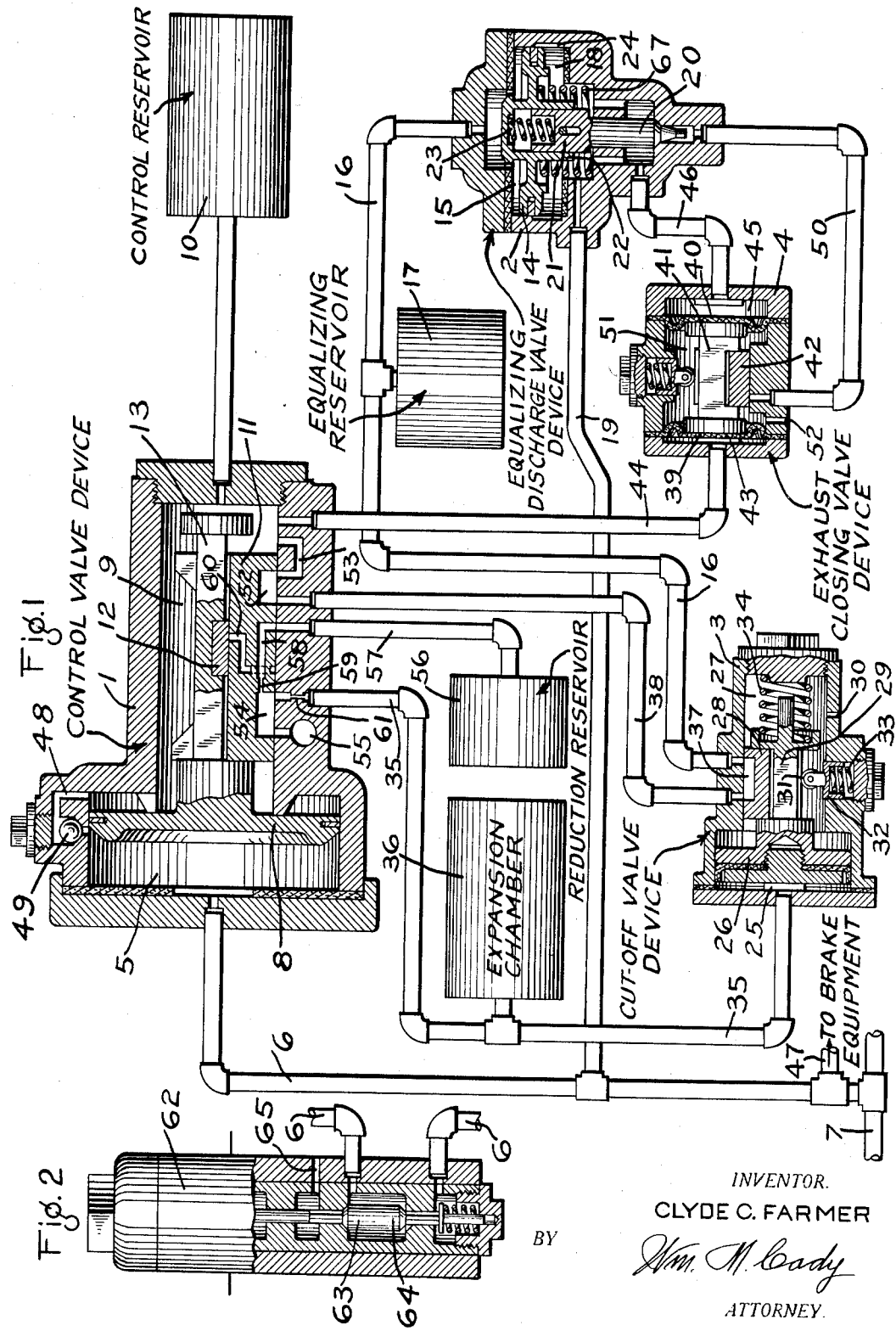

1,961,101

UNITED STATES PATENT OFFICE 1,961,101

CONTROL OF BRAKES FROM CABOOSE

Clyde C. Farmer, Pittsburgh, Pa., assignor to The Westinghouse Air Brake Company, Wilmerding, Pa., a corporation of Pennsylvania Application December 16, 1930, Serial No. 502,716

6 Claims. (Cl. 303—47)

This invention relates to fluid pressure brakes, and more particularly to an automatic fluid pressure brake system in which the brakes are applied by effecting a reduction in brake pipe pressure.

With the present freight brake equipment, a service rate of reduction in brake pipe pressure is initiated only on the locomotive at the head end of the train and the entire brake pipe volume, except any reduction due to the local quick service action at each triple valve device, must reduce through the brake valve on the locomotive.

By reason of the resistance to the flow of fluid through the brake pipe from the rear of the train, the reduction in pressure in the brake pipe on cars at the head end of the train is heavier than at the rear, which results in a greater brake cylinder pressure being obtained on cars at the head end of the train than on cars at the rear end, and as this occurs prior to the running in of the slack in the train, heavy shocks are liable to be produced.

One object of my invention is to provide means on the caboose or rear end vehicle for effecting a predetermined reduction in brake pipe pressure at a service rate.

It is also possible with the present brake equipment, should an angle cock become closed in the train, that the pressure in the brake pipe may leak down at such a slow rate, that auxiliary reservoir pressure can flow back through the usual feed groove around the triple valve piston, at a corresponding rate, so that a sufficient differential in pressures between the auxiliary reservoir and the brake pipe will not be obtained in order to cause movement of the triple valve piston so as to close the feed groove. Under these conditions, no application of the brakes will be possible on cars of the train back of the closed angle cock.

Another object of my invention is to provide means on the caboose or rear car of the train which will operate at a slow rate of brake pipe reduction, such as would result by leakage behind a closed angle cock, to effect a sufficient reduction in brake pipe pressure to ensure an application of the brakes and which will be sufficiently stabilized so that operation to effect an application of the brakes will not take place on fluctuations of brake pipe pressure, due to variable action of the usual brake pipe feed valve device.

In the accompanying drawing; Fig. 1 is a diagrammatic view, partly in section, of a caboose or rear car brake controlling apparatus embodying my invention; and Fig. 2 a view of an electro-pneumatic valve device, which may be employed in controlling the operation of the apparatus shown in Fig. 1.

As shown in Fig. 1, the apparatus may comprise a control valve device 1, an equalizing discharge valve device 2, an equalizing reservoir cut-off valve device 3, and an equalizing exhaust closing valve device 4.

The control valve device 1 may comprise a casing having a piston chamber 5, connected by a branch pipe 6 to the usual brake pipe 7 and containing a piston 8. The valve chamber 9 at the opposite side of piston 8 is connected to a control reservoir 10 and contains a main slide valve 11 and an auxiliary slide valve 12 adapted to be operated, through a piston stem 13, by the piston 8.

The equalizing discharge valve device 2 may comprise a casing containing a piston 14, having the chamber 15 at one side connected by a pipe 16 with an equalizing reservoir 17 and having the chamber 18 at the opposite side connected by a pipe 19 to the branch pipe 6. The piston 14 is adapted to operate a discharge valve 20 and the construction is preferably of the collapsible type in which the stem of the valve 20 is provided with an enlarged portion 21 which slides in a hollow stem 22 of the piston 14 and having a coil spring 23 interposed between the piston and the valve to oppose downward movement of the piston 14 relative to the valve 20, after the valve 20 is seated. If the pressure in the equalizing reservoir 17 in chamber 15 should rise above the brake pipe pressure in chamber 18, the piston 14 will be moved down, so as to open by-pass grooves 24, and thus permit the equalization of the excess pressure in the equalizing reservoir into the brake pipe.

The equalizing reservoir cut-off valve device 3 may comprise a casing having a piston chamber 25 containing a piston 26, and a valve chamber 27 at the opposite side of the piston containing a slide valve 28, adapted to be operated by piston 26, through a piston stem 29. The chamber 27 is open to the atmosphere through a port 30, and the slide valve 28 is maintained seated by a roller 31 carried by a movable member 32 subject to the pressure of a spring 33. A coil spring 34, acting on the piston stem 29, tends to maintain the moving parts in the left hand position, as shown in the drawing.

The chamber 25 is connected by pipe 35 to an expansion chamber 36 and in the normal position of the slide valve 28, the pipe 16 is connected, through a cavity 37, with a pipe 38, leading to the seat of slide valve 11.

The exhaust closing valve device 4 may comprise a casing containing a pair of flexible diaphragms 39 and 40, spaced by a stem 41, which stem is adapted to operate a slide valve 42. The chamber 43, at the outer face of diaphragm 39 is connected to a pipe 44, leading to valve chamber 9 of the control valve device 1. Chamber 45, at the outer face of diaphragm 40 is connected by pipe 46 to chamber 18 of the equalizing discharge valve device 2.

The branch pipe 6 is connected to a pipe 47, which leads to the usual fluid pressure brake equipment on the car (not shown) and which is operated by a reduction in brake pipe pressure to effect an application of the brakes.

In operation, when the brake pipe is charged with fluid under pressure, fluid under pressure flows through the branch pipe 6 and pipe 47 to charge the usual brake equipment in the usual manner and also to piston chamber 5, shifting the piston 8 to its normal release position, as shown in the drawing, in which piston chamber 5 is connected to valve chamber 9 through a passage 48 containing a non-return check valve 49. The control reservoir 10 is thus charged with fluid under pressure. Fluid under pressure also flows from the brake pipe through pipe 19 to chamber 18 of the equalizing discharge valve device 2 and thence through pipe 46 to diaphragm chamber 45. Fluid at control reservoir pressure is supplied through pipe 44 to diaphragm chamber 43 of the exhaust closing valve device, and the brake pipe pressure in chamber 45 being greater than the control reservoir pressure in chamber 43, the diaphragms 39 and 40 will be shifted to the left, as shown in the drawing, in which position, the slide valve 42 cuts off communication from a pipe 50, through which the equalizing discharge valve exhausts, to chamber 51 intermediate the diaphragms 39 and 40, which chamber is open to the atmosphere, by way of port 52.

In the release position of slide valve 11, pipe 35, leading to the piston chamber 25, is connected, through cavity 54 in slide valve 11, with an exhaust port 55, so that piston chamber 25 is at atmospheric pressure, permitting the spring 34 to maintain the piston 26 and the valve 28 in the left hand position, as shown in the drawing.

In this position of slide valve 28, pipe 38 is connected, through cavity 37, with pipe 16. In the release position of slide valve 11, valve chamber 9 and the control reservoir 10 are connected to pipe 38, through port 53 and cavity 52, and consequently, the equalizing reservoir 17 is charged with fluid under pressure from the control reservoir 10, by way of pipe 38, cavity 37 in valve 28, and pipe 16.

In the release position of slide valve 11, a reduction reservoir 56 is connected to the exhaust port 55 through pipe 57, port 58 in slide valve 11 having a restricted flow portion 59, and cavity 54.

The apparatus being charged with fluid under pressure as above described, if the brake pipe pressure is reduced due to serial quick service action or by reason of leakage from the brake pipe at the rear of a closed angle cock, since the control reservoir pressure in chamber 43 will then exceed the reduced brake pipe pressure in chamber 45, the diaphragms 39 and 40 will be shifted to the right, so that slide valve 42 is moved to open communication from the equalizing discharge exhaust pipe 50 to chamber 51 and the atmosphere.

Control reservoir pressure will also force piston 8 to the left against its outer seal, first moving the graduating valve 12 so as to uncover a port 60 and then moving the main slide valve 11, so that port 60 registers with pipe and passage 35. Fluid under pressure then flows from the control reservoir 10 to the expansion reservoir 36 at a rate controlled by the restricted flow passage 61.

In this position of slide valve 11, cavity 52 connects pipe 38 with pipe 57, so that the equalizing reservoir 17 is now connected to the reduction reservoir 56 and consequently the pressure in the equalizing reservoir is reduced to a predetermined degree by equalization into the reduction reservoir 56.

The reduction in equalizing reservoir pressure in chamber 15 of the equalizing discharge valve device 2, causes the brake pipe pressure in chamber 18 to force the piston 14 upwardly, so that the discharge valve 20 is unseated and fluid under pressure is then vented from the brake pipe through pipe 50, chamber 51 and exhaust 52. When the brake pipe pressure has thus been reduced to a predetermined degree slightly less than the pressure at which the equalizing reservoir equalizes into the reduction reservoir 56, the piston 14 is operated to close the valve 20 and thus prevent the further reduction of pressure in the brake pipe.

It will thus be seen that the operation of the above described apparatus on the caboose or rear vehicle of a train ensures that the brake pipe pressure will be reduced to a predetermined desired degree, so that an application of the brakes will be positively secured on cars at the rear of the train, when only a quick service reduction in brake pipe pressure reaches the caboose or by leakage from the brake pipe when an angle cock is closed.

The ball check valve 49 prevents back flow from the control reservoir to the brake pipe, so that a differential pressure can be created between the control reservoir and the brake pipe to ensure movement of the piston 8 to its outer position.

The possible flow of fluid from the control reservoir 10 to the expansion reservoir 36 at a faster rate than the brake pipe pressure reduces is prevented by the action of the graduating valve 12 which is operated by piston 8 to close the port 60 in case the pressure in the control reservoir reduces at a faster rate than the brake pipe pressure. This also prevents the movement of the control piston 8 to release position, until a definite increase in brake pipe pressure has been obtained.

The function of the exhaust closing valve device 4 is to hold the exhaust from the discharge valve 20 closed when charging the brake pipe, the discharge valve device being quite sensitive to variations in pressure may operate to open the discharge valve when the brake pipe pressure is increased, but this opening of the discharge valve will be ineffective to vent fluid from the brake pipe, since the slide valve 42 at this time closes communication from the equalizing discharge exhaust pipe 50 to the atmosphere.

The purpose of the equalizing reservoir cut-off valve device 3 is to isolate the equalizing reservoir 17 after the equalizing reservoir has equalized into the reduction reservoir, so as to prevent a further reduction in brake pipe pressure in case of a surge in brake pipe pressure such as might cause movement of the control piston 8 to release position and then back to application position. Without the equalizing reservoir cut-off valve device, when the slide valve 11 is shifted to release position, the reduction reservoir 56 would be connected to the atmosphere, so as to reduce the pressure in said reservoir, and then when the slide valve 11 is again moved to application position, the equalizing reservoir pressure would be further reduced by again equalizing into the reduction reservoir.

With the equalizing reservoir cut-off valve device in operation, when the pressure in the expansion reservoir 36 has been increased by equalization of the control reservoir pressure into same, the equalized pressure acting in chamber 25 will be sufficient to overcome the pressure of spring 34, so that piston 26 will be shifted to the right, moving the slide valve 28, so as to cut off the equalizing reservoir from the pipe 38.

The spring 67 acting below the equalizing piston 14 is only for the purpose of offsetting the weight of the piston 14, so as to make the piston more sensitive to movement. The equalizing piston is preferably of the collapsible type as shown, with a gasket seal below the piston to prevent leakage from reducing the equalizing reservoir pressure when the brake pipe is reduced below the pressure in the equalizing reservoir.

If electric current is available on the train, the operation of the control valve device may be initiated electrically as well as by a reduction in brake pipe pressure and for this purpose, an electro-pneumatic valve device may be provided, such as shown in Fig. 2, comprising a magnet 62 connected in an electric train line circuit and adapted to operate double beat valves 63 and 64. The double beat valves control communication through the pipe 6, leading to the piston chamber 5, so that when the magnet 62 is deenergized, the valve 63 will be seated and the valve 64 unseated.

With valve 64 unseated, communication through the pipe 6 is established, so that if the brake pipe pressure is reduced, the piston 8 will be operated as hereinbefore described. The circuit of the magnet 62 may be controlled by the movement of the brake valve device (not shown) on the locomotive, so that the magnet 62 will be deenergized when the brake valve is in running or release positions. When the brake valve device is moved to service application position or any position other than running or release position, the magnet 62 may be energized.

When the magnet 62 is energized, the valve 64 will be seated and the valve 63 unseated, so that fluid is vented from the piston chamber 5 to the atmospheric exhaust port 65. The control valve device 1 is then operated in the same manner as hereinbefore described, so as to cause a predetermined reduction in brake pipe pressure at the rear end of the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake system, the combination with a brake pipe, of valve means installed only on a rear vehicle of a train and operated by a variation in fluid pressure for effecting a reduction in brake pipe pressure, a control reservoir and a valve device subject to the opposing pressures of the control reservoir and the brake pipe and including means operated upon a slight but definite reduction in brake pipe pressure for effecting a variation in fluid pressure on said valve means, said control reservoir being charged from the brake pipe through a passage in the release position of said valve device, and a check valve for preventing back flow from said reservoir through said passage to the brake pipe.

2. In a fluid pressure brake system, the combination with a brake pipe, of an equalizing reservoir, valve mechanism operated by a reduction in pressure in the equalizing reservoir for venting fluid under pressure from the brake pipe, a control reservoir, an expansion chamber, and a control valve device subject to the opposing pressures of the control reservoir and the brake pipe and operated upon a reduction in brake pipe pressure for venting fluid from the control reservoir to the expansion chamber and for venting fluid from said equalizing reservoir.

3. In a fluid pressure brake system, the combination with a brake pipe, of an equalizing reservoir, valve mechanism operated by a reduction in pressure in the equalizing reservoir for venting fluid under pressure from the brake pipe, a control reservoir, an expansion chamber, a control valve device operated upon a reduction in brake pipe pressure for venting fluid from the control reservoir to the expansion chamber and for venting fluid from the equalizing reservoir, and a valve device operated upon a predetermined increase in pressure in the expansion chamber for cutting off communication through which said control valve device vents fluid from the equalizing reservoir.

4. In a fluid pressure brake, the combination with a brake pipe, of a valve mechanism operated upon a reduction in fluid pressure for venting fluid under pressure from the brake pipe, a control valve device operated upon a reduction in brake pipe pressure for venting fluid from said valve mechanism and a valve device separate from said control device and normally closing communication through which said valve mechanism vents fluid from the brake pipe, and movable independently of said control valve device upon a reduction in fluid pressure thereon for opening said communication.

5. In a fluid pressure brake, the combination with a brake pipe, of a valve mechanism operated upon a reduction in fluid pressure for venting fluid under pressure from the brake pipe, a control valve device operated upon a reduction in brake pipe pressure for venting fluid from said valve mechanism, and a valve device separate from said control device and subject to brake pipe pressure for normally closing communication through which said valve mechanism vents fluid from the brake pipe and movable independently of said control valve device by a reduction in brake pipe pressure for opening said communication.

6. In a fluid pressure brake, the combination with a brake pipe, of a valve mechanism operated upon a reduction in fluid pressure for venting fluid under pressure from the brake pipe, a control reservoir, a control valve device subject to the opposing pressures of the control reservoir and the brake pipe and operated upon a reduction in brake pipe pressure for venting fluid from said valve mechanism, and a valve device comprising movable abutments subject to the opposing pressures of the control reservoir and the brake pipe and a slide valve operated by said abutments for normally closing communication through which said valve mechanism vents fluid from the brake pipe, said slide valve being operated by said abutments upon a reduction in brake pipe pressure for opening said communication.

CLYDE C. FARMER.